United States Patent [19]

Ours

[11] Patent Number: 4,651,444
[45] Date of Patent: Mar. 24, 1987

[54] METHOD OF MANUFACTURE OF A SHOE, A MOLD FOR CARRYING OUT SAID METHOD AND A SHOE THUS PRODUCED

[76] Inventor: Roger Ours, 62, Avenue Clarisse, F-92420 Vaucresson, France

[21] Appl. No.: 713,630

[22] Filed: Mar. 19, 1985

[30] Foreign Application Priority Data

Mar. 27, 1984 [FR] France ............................... 84 04717

[51] Int. Cl.⁴ ..................... A43B 7/14; A43D 65/00; B29C 45/00
[52] U.S. Cl. ........................................ 36/93; 36/88; 264/244; 425/129 S; 12/142 T
[58] Field of Search ................... 36/45, 93, 88, 83, 98; 12/142 EV, 142 RS, 142 T, 148; 264/244; 425/119, 129 S

[56] References Cited

U.S. PATENT DOCUMENTS

| | | | |
|---|---|---|---|
| 2,040,921 | 5/1936 | Corbin, Jr. | 36/83 |
| 2,619,741 | 12/1952 | Clark | 36/83 |
| 2,982,033 | 5/1961 | Bingham, Jr. | 36/45 |
| 3,541,646 | 11/1970 | Baudov | 425/129 S |
| 3,786,580 | 1/1974 | Dalebout | 36/93 |
| 3,896,202 | 7/1975 | Palau | 264/244 |
| 3,958,291 | 5/1976 | Spier | 264/244 |
| 4,120,064 | 10/1978 | Salomon | 36/93 |
| 4,276,254 | 6/1981 | Combronde | 264/244 |
| 4,292,746 | 10/1981 | Delaney | 36/45 |
| 4,414,762 | 11/1983 | Salomon et al. | 36/93 |

FOREIGN PATENT DOCUMENTS

| | | | |
|---|---|---|---|
| 2456754 | 6/1975 | Fed. Rep. of Germany | 36/93 |
| 1253975 | 1/1961 | France | |
| 1353780 | 1/1964 | France | |
| 1580513 | 9/1969 | France | |
| 2331297 | 6/1977 | France | |
| 2339356 | 8/1977 | France | |
| 2493112 | 11/1983 | France | |
| 0055817 | 4/1980 | Japan | 12/142 RS |
| 436038 | 11/1967 | Switzerland | 264/244 |

Primary Examiner—Werner H. Schroeder
Assistant Examiner—Steven N. Meyers
Attorney, Agent, or Firm—Young & Thompson

[57] ABSTRACT

A shoe of the high-upper type is formed by two slippers of leather or like material and of different size. One slipper is engaged within the other, a metal former is placed within the inner slipper, and the assembly is placed within a mold comprising two halves and a bottom mold block corresponding to the outsole and provided with an injection sprue. The plastic injected through the sprue passes through an injection orifice in the bottom slipper sole, spreads within the internal space between the two slipper soles so as to form the insole, then passes downwards through holes located in uniformly spaced relation in the bottom slipper sole and spreads between the bottom sole and the mold block so as to form the outsole which is thus intimately bonded to the insole. At the same time, the injected plastic flows upwards within the internal space between the two slippers so as to form the upper of the shoe.

11 Claims, 19 Drawing Figures

METHOD OF MANUFACTURE OF A SHOE, A MOLD FOR CARRYING OUT SAID METHOD AND A SHOE THUS PRODUCED

BACKGROUND OF THE INVENTION

1. Field of the Invention

The present invention relates to the manufacture of shoes, especially sporting shoes and boots having high uppers, such as ice-skating boots, ski boots or football boots. It will be understood that the general term "shoe" as used in this specification and appended claims applies to all high-cut shoes including those known as "boots".

2. Description of the Prior Art

In order to provide greater strength and/or in order to ensure water-tightness of certain parts of a shoe, it has already been proposed to manufacture them by providing molded parts of plastic on elements which may be made of leather or any other suitable material and which serve as supports for the molded parts. A design solution of this type has already been proposed with a view to reducing production costs.

Thus French Pat. No. FR 1,353,780 describes a method of manufacture which consists in injecting plastic between the outsole and the insole of a shoe, the upper of the shoe having already been joined to the insole of said shoe in a previous operation. However, the injection of plastic is strictly limited to the sole and in no way involves the upper of the shoe. The same remark applies to the methods described in French Pat. Nos. FR 1,580,513 and 2,339,356.

In regard to French Pat. No. FR 2,420,312, this specification describes a shoe having an external shell of plastic overmolded on an inner slipper of leather. The outsole is molded at the same time on a stiffening reinforcement which constitutes the counter for the heel of the shoe as well as a thin intermediate sole. This shoe offers undoubted advantages in regard to stability of shape and water-tightness. A disadvantage, however, is that a shoe of this type is relatively heavy and has an unattractive appearance by reason of the conspicuous presence of the outer plastic shell.

In a completely different order of ideas, French Pat. No. FR 2,493,112 describes a method of manufacture of a slipper which is intended to be placed within a ski boot. In accordance with this method, the slipper is formed by injecting plastic foam between an inner sock of fabric and an outer sock constituted by a thin extensible film of polyurethane. The injection proposed in the cited patent takes place through an orifice provided in the top portion of the outer sock. The layer thus injected is uniform and of the same nature, both in the upper portion of the slipper and in the portion corresponding to the sole. This method therefore does not result in the formation of a true sole which is comparable with the sole of a shoe. Such a result is in any case not even contemplated by the method considered since it is concerned only with the manufacture of an internal slipper for the purpose of forming a virtual shock-absorbing and protective cushion around the user's foot.

In consequence, the different methods recalled in the foregoing are in no way applicable to the manufacture of a shoe of the high-upper type in which both the sole and the upper have to be reinforced, with the exception, however, of the method described in French Pat. No. FR 2,430,312. However, this method suffers from the major drawbacks mentioned earlier.

It is for the reasons given in the foregoing that the object of the present invention is to propose a method of manufacture which affords the advantages of overmolding of a layer of plastic but is not subject to any of the disadvantages attached to present-day shoes of this type. With this objective, the basic concept of the method in accordance with the present invention makes it possible to obtain a shoe having the appearance of a normal leather shoe in which any potential danger of detachment of the molded layer of plastic is completely removed.

SUMMARY OF THE INVENTION

The method in accordance with the invention comprises the following steps:

fabrication of two high-upper slippers of leather or like material of any suitable type, one of said slippers being of larger size than the other at all points and provided in the sole of said slipper with an orifice for the injection of plastic;

engagement of the slipper of smaller size within the slipper of larger size, positioning of a metal former within the inner slipper, placing the complete assembly within a mold comprising a bottom mold block corresponding to the sole and provided with a sprue for injection of plastic, the opening of said sprue being located opposite to the injection orifice of the sole of the outer slipper;

injection of plastic through the sprue, with the result that the injected plastic spreads within the internal space between the two soles and the two uppers of the two slippers and that the different parts of the finished shoe are constituted by the combination of two layers of leather or like material of any suitable type between which is enclosed a layer of plastic.

In accordance with another distinctive feature of the method contemplated by the invention, all or part of the outsole is formed by molding of plastic material by providing the sole of the outer slipper with holes for the flow of plastic and by providing a suitable molding space or cavity in the block which closes the corresponding end of the mold. However, the outsole can also be formed during a second molding operation or else can be constituted by a previously-molded sole which is positioned within the mold in order to be joined to the sole of the outer slipper by means of the plastic which flows through the holes formed in said sole.

The present invention is also directed to a mold specially designed for the practical application of the method now under consideration as well as to the shoes obtained by means of this method.

These shoes are therefore distinguished by the fact that the upper as well as the sole of each shoe are constituted by the combination of two layers of leather or like material of any suitable type between which is enclosed a layer of plastic, in addition to which another layer of plastic can be overmolded against the underface of the composite sole thus formed in order to constitute an outsole.

BRIEF DESCRIPTION OF THE DRAWINGS

Other features of the invention will be more apparent upon consideration of the following description and accompanying drawings, wherein:

FIGS. 1 and 2 are views in perspective showing two slippers of leather or any suitable material of a similar type between which is injected a layer of plastic;

FIG. 3 is a sectional view showing a detail and taken along line III—III of FIG. 2;

FIG. 5 is a side elevation view of the metal former provided within the mold which is employed for the practical application of the method in accordance with the invention;

DESCRIPTION OF THE PREFERRED EMBODIMENTS

As mentioned earlier, the application of the method in accordance with the invention involves the use of two slippers of leather or any other suitable material, that is, a first inner slipper 1 and a second outer slipper 2 which has slightly larger dimensions than the first in order to ensure that these two slippers can be fitted one inside the other.

Each of these slippers is constituted by an upper and a sole as designated respectively by the reference numeral 3 in the case of the sole of the inner slipper 1 and by the reference numeral 4 in the case of the sole of the outer slipper 2. Each slipper sole is fastened to the bottom edge of the corresponding upper by joining the edges together in an overcast stitch or so-called Ströbel stitch so as to form a saddle seam. In order to ensure that the seam formed around the sole 4 of the outer slipper is not subsequently visible, the corresponding seam line must be displaced to a slight extent in the inward direction.

The upper of each slipper is constituted by two complementary portions or so-called "half-vamps" designated respectively by the reference numeral 5 in the case of the inner slipper and by the numeral 6 in the case of the outer slipper. At the rear end, the two half-vamps are assembled together by means of a saddle seam or the like. However, a back strip 7 is stitched over the seam formed at the rear end of the upper of the outer slipper. At the toe end, the two half-vamps 5 of the upper of the inner slipper are assembled together by means of a saddle seam in the same manner. At the same point, however, the corresponding edges 7 of the two complementary portions 6 of the upper of the outer slipper are folded inwards and sewn against each other as shown in FIG. 3.

Figure 4:
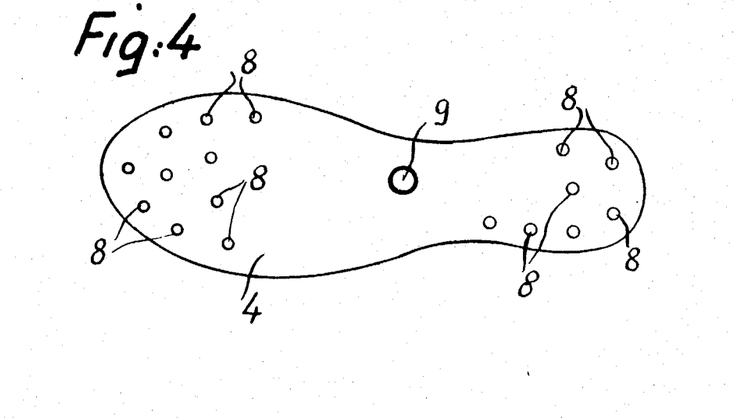
FIG. 4 is a bottom view of the sole of the outer slipper.

The sole 4 of the outer slipper 2 is provided with a plurality of small perforations 8 which are distributed over its entire surface and are intended to serve as passages for the plastic at the time of injection of this latter. However, said sole also has a larger opening 9 which is intended to permit injection of plastic between the soles of the two slippers 1 and 2.

Figure 6:
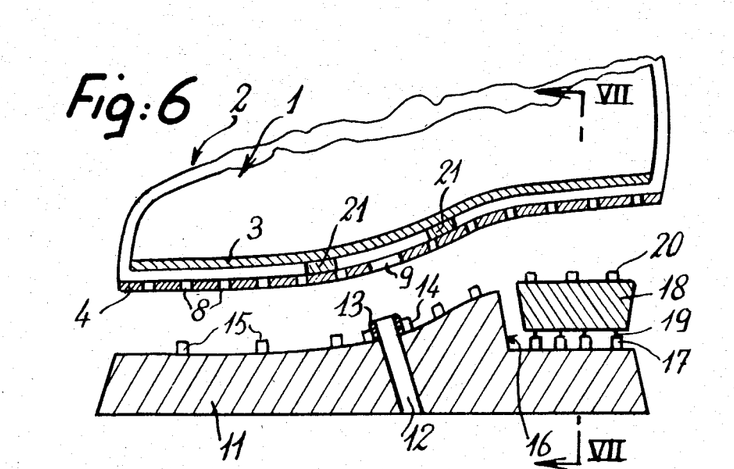
FIG. 6 is a longitudinal sectional view which illustrates the positioning of the two slippers of leather or any other suitable material on the mold component or block which corresponds to the sole of the shoe.
Figure 7:
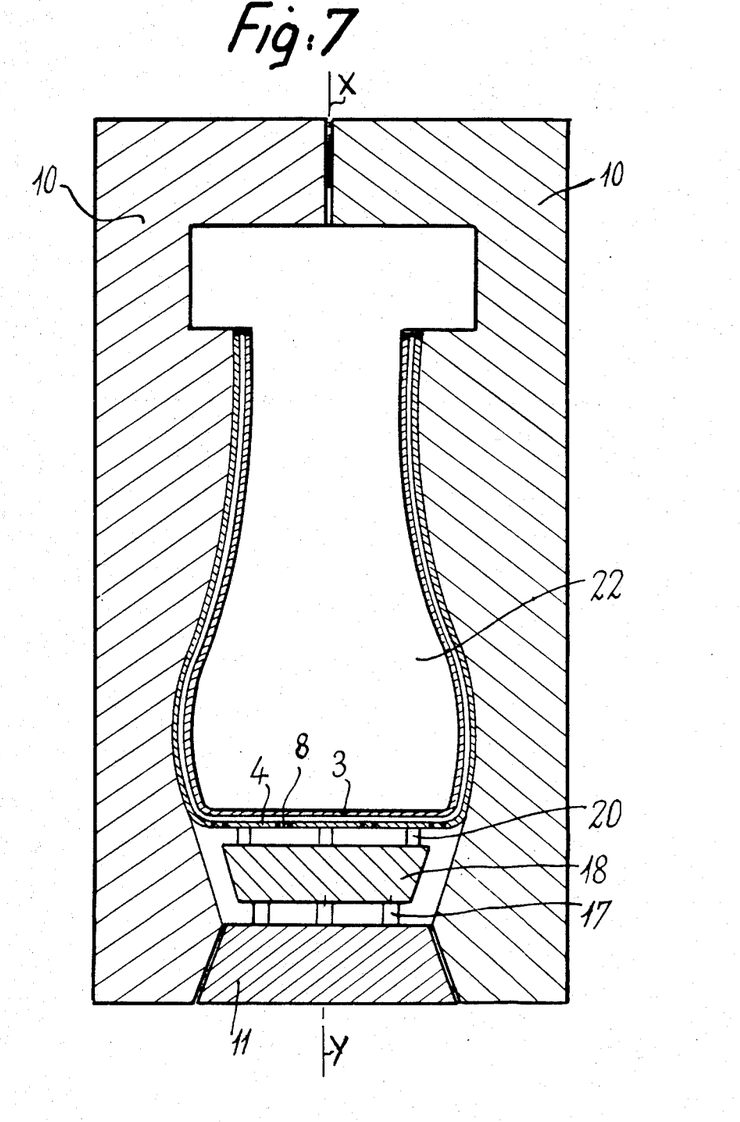
FIG. 7 is a transverse sectional view of the mold employed, this view being taken on the plane of section corresponding to the line VII—VII of FIG. 6, the application of the method in accordance with the invention being shown in this figure at a stage which immediately precedes the injection of plastic.

The mold employed for the practical application of the method under consideration comprises two symmetrical parts 10 assembled together along a joint plane X-Y and a third part 11 or so-called mold block which corresponds to the sole of the shoe. In regard to the two halves of the mold or parts 10, they correspond to the upper of the shoe as well as to the portion surrounding the sole.

The mold block 11 has an injection duct 12 or sprue which opens into a nozzle 13, said nozzle being so arranged as to project from the internal mold face. The position of the orifice 9 of the sole 4 of the outer slipper is such that said orifice can be tightly fitted over said nozzle. However, an annular flange 14 is provided around the nozzle in order to maintain the sole 4 at a distance from the internal face of the mold block 11. In addition, a series of projecting studs 15 are also formed on the internal face of said block for the purpose of maintaining the sole 4 at a distance from this latter which will subsequently correspond to the thickness of the plastic outsole which results from injection of plastic into the interior of the mold.

The block 11 is provided at the rear end with a recessed portion 16 corresponding to the heel of the shoe. In this location, the top face of said block is adapted to carry a series of projecting studs 17 for receiving a heel core 18 which is advantageously of material having a particularly high degree of hardness. The studs 17 perform the same function as the studs 15 and accordingly serve to maintain the heel core 18 at a distance from the top face of the mold block 11. However, these studs can advantageously be provided with spikes 19 which are intended to engage in corresponding blind-end bores formed in the heel core 18. This arrangement makes it possible to prevent any accidental displacement of said core under the action of the pressure of plastic during injection of this latter into the mold cavity.

It is worthy of note in this connection that any displacement of the sole 4 of the outer slipper 2 at this moment is also prevented by virtue of the fact that its orifice 9 is tightly fitted over the upper end of the injection nozzle 13. Furthermore, said sole is held in position around its entire periphery by means of the internal walls of the two halves 10 of the mold.

The top face of the heel core 18 is adapted to carry a plurality of projecting studs 20 which perform the same function as the studs 15 of the mold block 11. The purpose of said studs 20 is to maintain the rear portion of the sole at a distance from the heel core 18 in order to permit the flow of plastic between these two parts.

Preferably, spacer members 21 can be placed for the same purpose between the soles 3 and 4 of the two slippers 1 and 2. It is an advantage in particular to provide spacer members of this type on each side of or around the orifice 9 through which the plastic is injected. At other locations, however, spacer members are not essential since the pressure of injection of plastic is sufficient to ensure distribution of the plastic between the two soles 3 and 4 as well as between the two uppers 5 and 6 of the two slippers. After engaging said slippers one inside the other and positioning them on the metal former 22 shown in FIG. 5, the complete assembly is placed within the mold cavity as shown in FIG. 7. It should be noted in this connection that the underface of the former 22 can be adapted to carry pins which are intended to pass through the soles of both slippers 1 and 2 in order to prevent any accidental displacement of these latter during the injection operation. The injected plastic is forced under pressure through the sprue 12 and the nozzle 13. The plastic thus spreads within the internal space provided between the two slippers 1 and 2, both between the soles and between the uppers of said slippers up to the top edge of said uppers.

However, by reason of the presence of the perforations 8 in the sole 4 of the outer slipper, the plastic flows down beneath the sole and fills the internal space which exists between this latter and the mold block 11. The layer of plastic thus poured in this region forms the outsole 23. At the rear end of the shoe, this layer of plastic flows around and encapsulates the packing core 18 so as to form the heel 24 of the shoe.

Figure 9:
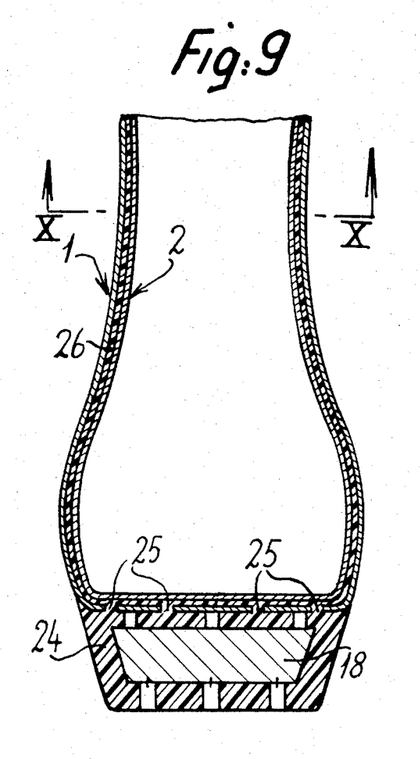
FIG. 9 is a transverse sectional view taken along line IX—IX of FIG. 8.
Figure 10:
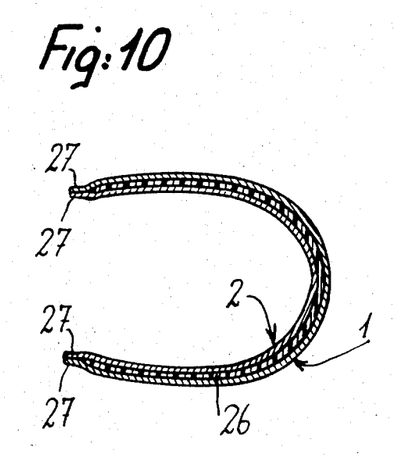
FIG. 10 is a sectional view taken along line X—X of FIG. 9.

The outsole 23 thus obtained is made perfectly integral with the sole 4 of the outer slipper 2 by reason of the large number of bonding elements 25 which are formed by molding within the passages 8. Said elements 25 have the effect of establishing a strong connection between the outsole and the layer of plastic located between the two soles 3 and 4. Under these conditions, there is absolutely no danger of accidental detachment of the outsole with respect to the soles of the two slippers 1 and 2.

As will readily be understood, the presence of the studs 15 and 17 on the top face of the mold block 11 has the effect of forming small depressions in the surface of the molded outsole of plastic material. In the majority of cases, however, such surface depressions do not constitute a disadvantage. Furthermore, if it should prove necessary to remove these depressions, a thin bottom outsole can be overmolded in a subsequent operation.

In regard to the layer 26 of plastic which is injected between the uppers of the two slippers 1 and 2, said layer is tightly enclosed between said uppers. In order to produce a perfect bond between this layer of plastic and the two layers of leather located on each side, a preliminary operation consists in coating the corresponding faces of the uppers of both slippers with an adhesive which can be activated under the action of the heat released by the plastic at the moment of injection.

Under these conditions, after injection of the plastic, the uppers of the two slippers are perfectly bonded to the intermediate layer 26 and these three layers form an absolutely homogeneous assembly which is not liable to be dissociated. Furthermore, any danger of accidental separation of these layers with respect to each other is radically removed by virtue of the fact that the plastic layer 26 is trapped between the two layers of leather constituted by the uppers of the two slippers 1 and 2.

The gap which is left free between the inner walls of the mold and the outer wall of the internal metal former 22 has variable thicknesses in order to provide a greater thickness in certain regions corresponding to portions of the shoe which have to be made more rigid than others. Thus in the case of ice-skating boots, it is desirable to ensure that the stiffening counter for the heel of the shoe as well as the back portion of the upper have a higher degree of rigidity than the remainder. Under these conditions, provision is made for an overthickness of the internal space in the corresponding regions, thus making it possible to maintain a certain degree of flexibility in the other portions of the shoe.

It will be readily apparent that the location of the regions to be reinforced in this manner varies according to the nature and intended use of the shoes to be manufactured such as sporting shoes, for example, or else safety shoes for certain special kinds of work.

By reducing the thickness of the internal space left free between the parts of the mold and the internal former 22, it is possible to bring the uppers of the two slippers into close contact along the outer edges of said uppers. It is accordingly apparent from FIG. 10 that the corresponding edges 27 of the two uppers are in direct contact without any interposition of plastic material since the intermediate layer 26 cannot spread to this point. The only remaining operation consists in cutting the edges 27 of the two leather uppers in order to trim the corresponding edge of the upper of the shoe. It should be noted that the variation in thickness of the intermediate plastic layer 26 can also be obtained by reducing the thickness of predetermined portions of the uppers of the two shoes 1 and 2. In fact, an increase in thickness of the plastic layer in the corresponding regions is also obtained in such a case.

The advantage of shoes manufactured by means of the method in accordance with the invention lies in the fact that they have the outward appearance of normal leather shoes while having a reinforcement layer of plastic material. This is a considerable advantage, especially from a psychological standpoint since many users are reluctant to purchase shoes which appear to be made entirely of molded plastic. However, the shoes in accordance with the invention also have the advantage of comprising a leather lining which is constituted by the inner slipper 1 and ensures a high degree of comfort for the user's feet.

A further point which will readily be apparent is that the shoe in accordance with the invention is endowed with high stability of shape owing to the presence of the intermediate layer of plastic and of the outsole which is also made of molded plastic material. This is an essential advantage in the case of many sporting shoes. Thus in the case of ice-skating boots, shape stability permits more effective control of skates. The same advantage is again obtained in the case of ski boots or else in the case of football boots. Yet a further advantage of the method of manufacture in accordance with the invention arises from the fact that, at the time of injection of the intermediate layer 26 of plastic, the pressure of the plastic has the effect of powerfully applying the external face of the upper of the outer slipper 2 against the internal walls of the two halves 10 of the mold. Any surface defect which may exist on the upper of the outer slipper is thereby removed and the surface is thus made perfectly smooth. Even if the outer slipper is made of cheaper-grade leather, the result thereby achieved is a highly attractive outward appearance of the upper of the shoe. This accordingly makes it possible to reduce production costs by making use of leather of inferior quality.

Figure 8:
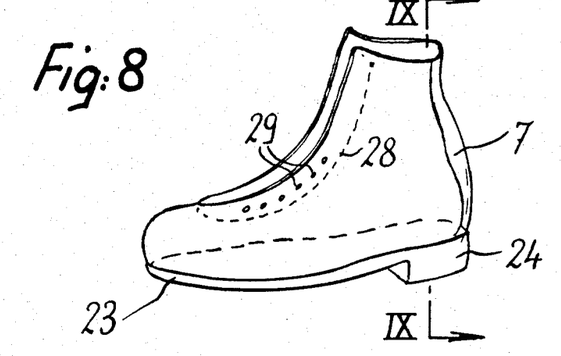
FIG. 8 is a view in perspective showing a shoe obtained as a result of the practical application of the method in accordance with the invention.

However, the phenomenon mentioned in the foregoing also permits the possibility of printing any pattern or any desired mark on the external surface of the shoe upper. By way of example, the pattern thus printed can consist of stitching lines 28 which extend alongside the lacing eyelets 29.

A point worthy of note in this connection is that the eyelet holes can be formed at the time of molding by means of projecting spikes which are provided on the internal wall of the mold and are intended to engage within holes formed beforehand in the uppers of the two slippers 1 and 2. A further advantage of these spikes is that they serve to maintain the uppers of both slippers in a perfectly stationary position in order to prevent any accidental displacement of said uppers under the pressure of the plastic while it is being injected.

Figure 11:
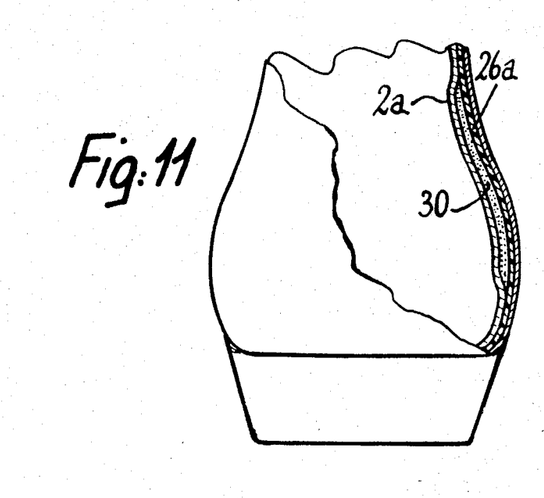
FIG. 11 is a fragmentary view in elevation showing the rear end of a shoe in accordance with the invention and corresponding to an alternative embodiment.
Figure 12:
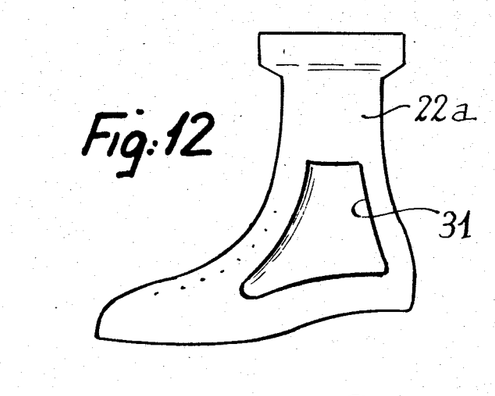
FIG. 12 is a view in side elevation showing the special metal former which is provided within the mold for the execution of this alternative embodiment.

FIG. 11 shows an alternative embodiment of the shoe in accordance with the invention which is so designed as to provide the shoe with an even greater degree of comfort. To this end, a pad 30 of rubber or plastic foam is applied against the external face of the upper of the corresponding inner slipper 2a at a location opposite to each malleolus or ankle-bone. The pads thus provided can accordingly be fixed by any suitable means such as gluing or stitching. In this embodiment, the metal former 22a which is placed inside the two leather slippers must in turn have a slight surface depression 31 on each side for the purpose of accommodating the overthickness resulting from the presence of the pads 30 without reducing the thickness of the internal space which is left free between the uppers of the two slippers.

A relatively substantial thickness may consequently be maintained in the case of the intermediate plastic layer 26a while providing two elastic pads 30 which guard against any danger of injury, inconvenience or discomfort as a result of the rigidity of the side walls of the shoe upper.

Figure 13:
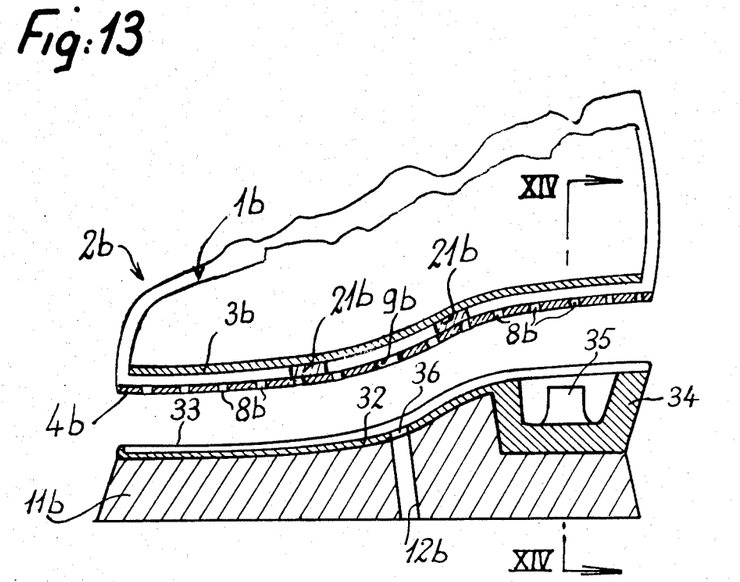
FIG. 13 is a view which is similar to FIG. 6 but which illustrates a second embodiment of the method in accordance with the invention.
Figure 14:
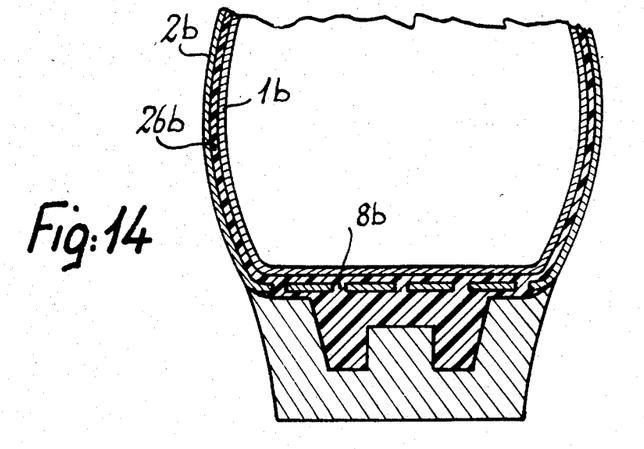
FIG. 14 is a fragmentary transverse sectional view which illustrates the shoe obtained in this case and corresponds to a cross-section taken along line XIV—XIV of FIG. 13.

FIGS. 13 and 14 illustrate a second embodiment of the method in accordance with the invention. In this embodiment, the outsole of the shoe is constituted by a sole 32 which is fabricated separately. This sole is formed in a preliminary operation which consists in molding from plastic material of the same type as the plastic which is subsequently injected between the two slippers 1b and 2b of the corresponding shoe. This condition is essential in order to ensure that the injected plastic coalesces and forms an integral bond with the material of the sole 32 thus provided. However, while being of the same nature, the material of this separate sole is chosen so as to afford a higher degree of rigidity than the plastic to be subsequently injected between the two slippers of the shoe. It is thus possible to obtain a higher degree of rigidity of the sole without in any way impairing the flexibility of the other parts of the shoe.

Preferably, the sole 32 thus provided has a projecting peripheral edge or "mock welt" 33. The rear end of the sole is adapted to carry a heel 34 of hollow construction. The cavity of said heel encloses a large projecting lug 35, the design function of which is to limit the quantity of plastic subsequently injected into said heel.

Finally, the separate sole under consideration is provided with an orifice 36 which is intended to be placed in register with the injection duct or sprue 12b provided in the block 11b of the corresponding mold.

In regard to the two slippers 1b and 2b employed in this particular case, they are absolutely identical with the slippers 1 and 2 employed in the preceding embodiments. In consequence, the sole 4b of the outer slipper 1b is provided with a plurality of perforations 8b as well as a larger orifice 9b which is intended to be placed in register with the orifice 36 of the sole 32 and consequently opposite to the injection sprue 12b.

Preferably, spacer members 21b are placed between the soles 3b and 4b of the two slippers in order to maintain them in spaced relation, at least at the location corresponding to the inlet orifice 9b for injection of plastic.

At the time of injection, the plastic spreads between the uppers of the two slippers as before in order to form an intermediate layer 26b. As in the preceding embodiment, the plastic also flows through the holes 8b of the sole 4b of the outer slipper. However, instead of forming an outsole beneath said outer slipper, the molten plastic which flows through said holes coalesces with the plastic material of the sole 32 which has previously been cast within the mold cavity. An intimate bond between the injected plastic and the plastic of the outsole 32 is thus ensured. Under these conditions, bonding of said outsole with the other parts of the shoe is as perfect as in the preceding embodiment.

It should be added that the shoe thus obtained offers advantages which are the same as before and which it will therefore not be necessary to recall here.

FIGS. 5 to 19 illustrate a third embodiment of the invention. In this form of construction, the sole 4c of the outer slipper 2c is constituted by a molded plastic component comprising a downwardly-projecting peripheral flange 43. The bottom edge of the upper 2c of said slipper is fastened to said flange 43 by means of a stitched seam 44. However, the bottom edge of the upper of the outer slipper 2c is provided in the rear portion thereof with an extension 45 which forms a kind of skirt around the heel location.

Figure 15:
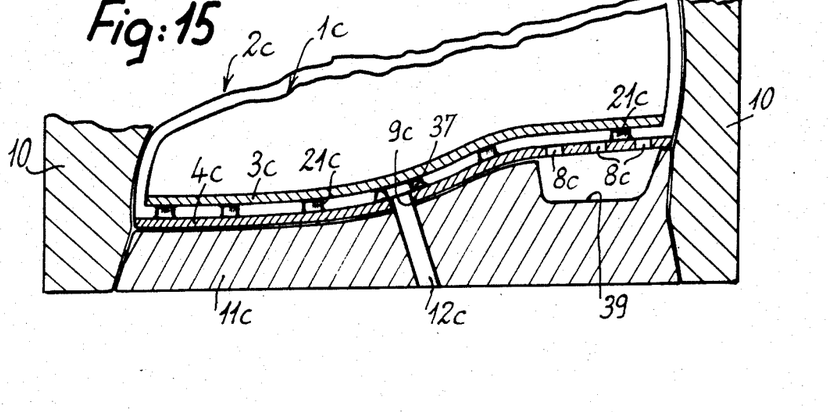
FIG. 15 is a sectional view which is similar to FIGS. 6 and 13 but which illustrates a third embodiment of the method in accordance with the invention.

The molded sole 4c has flow holes 8c only at the rear end, that is, at the heel location. In addition to these holes, said sole again has an orifice 9c for the injection of plastic between the two slippers 1c and 2c. In addition, the top face of the molded sole 4c is adapted to carry spacing studs 21c which are intended to maintain the requisite spacing between the soles of the two slippers as well as an annular collar 37 around the orifice 9c, there being formed in said annular collar slots 38 through which the plastic is intended to flow at the time of injection (see FIG. 17).

For the operation which consists in injecting an intermediate layer 26c of plastic between the two slippers, the bottom of the mold is closed by means of a mold block 11c which is applied against the sole 4c of the outer slipper while reserving a cavity 39 at the rear end of said mold block 11c. A heel core 40 is intended to be formed within said cavity 39 by the plastic which flows through the holes 8c. The shoe is therefore not provided with an outsole on completion of this operation.

Figure 16:
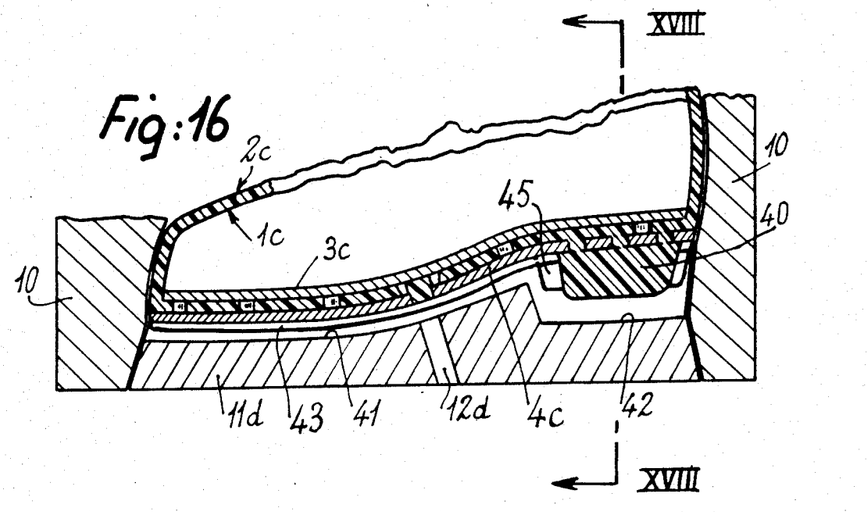
FIG. 16 is a similar view which illustrates the second molding operation performed in this particular embodiment.
Figure 17:
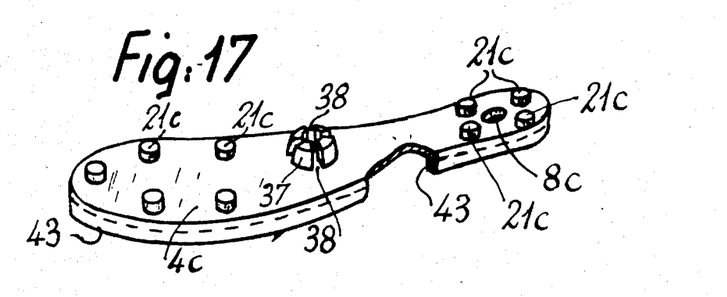
FIG. 17 is a view in perspective showing the outsole which can be provided in this case for the outer slipper, said outsole being made of molded plastic material.

The following operation consists in overmolding a sole of this type with plastic having a higher degree of rigidity than the plastic which is injected between the two slippers 1c and 2c. The same mold can be employed for this operation but the mold block 11c is replaced by a mold block 11d which reserves a space 41 for molding the outsole and another space 42 for molding the body of the heel around the internal core 40 which was formed during the previous operation. Preferably, the plastic material injected during this second operation is of the same nature as the plastic material constituting the sole 4c of the outer slipper 2c. However, the compositions of these materials are such as to produce different degrees of rigidity. Thus the material of the outsole coalesces by melting with the material of the sole 4c of the outer slipper so as to form one piece with this latter.

Figure 18:
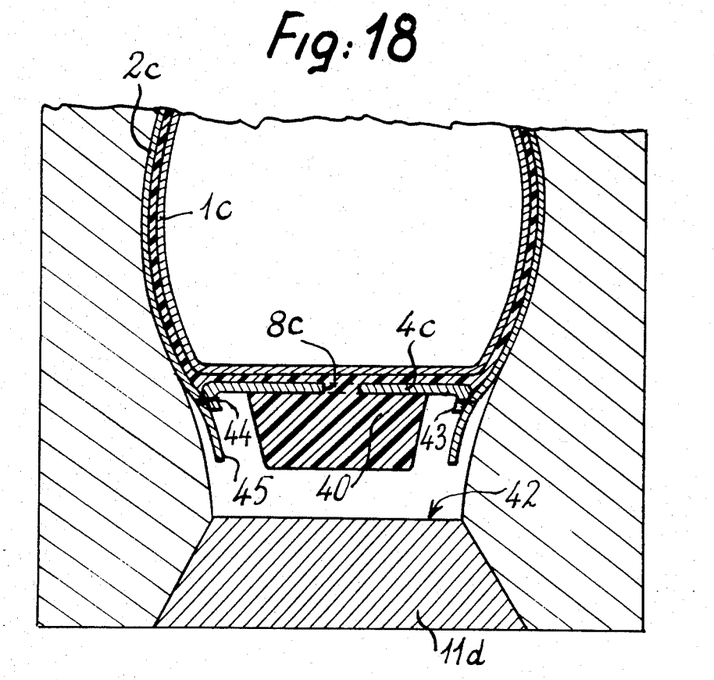
FIG. 18 is a fragmentary transverse sectional view taken along line XVIII—XVIII of FIG. 16.

It should be noted that, at the time of this second overmolding operation, the bottom skirt 45 of the upper of the outer slipper 2c is located within the mold cavity 42 as shown in FIG. 18. Under these conditions, after this operation, said skirt is embedded in the block 24c of plastic which constitutes the heel (see FIG. 19).

Figure 19:
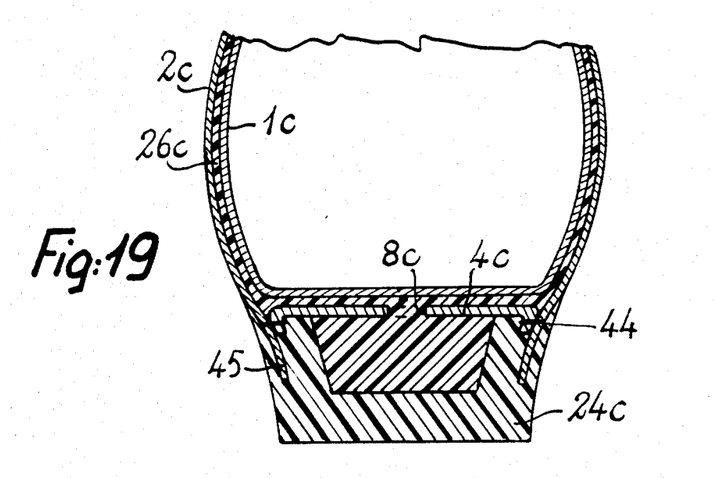
FIG. 19 is a fragmentary transverse sectional view of the shoe thus obtained.

This third embodiment has the advantage of making it possible to provide a relatively flexible plastic material between the two slippers 1c and 2c and a rigid material for the formation of the outsole. This also has the advantage of facilitating the attachment of any required accessories to the sole of the shoe such as, for example, an ice skate in the case of a skating boot or studs in the case of a football boot. Furthermore, the strength and rigidity of the sole are further enhanced by the fact that the sole 4c of the outer slipper 2c consists of a molded part of plastic material and that this latter is provided with a peripheral flange 43. A further noteworthy fact is that joining of the upper to the sole is considerably improved by providing the outer slipper 2c with a bottom skirt 45 which is embedded within the molded block 24c which constitutes the heel.

The practical application of this alternative embodiment of the method of manufacture in accordance with the invention does not give rise to any particular difficulties since it is possible to make use of a mold of the same type as those designed for two-step overmolding operations for injecting plastics of two different colors.

It should be noted that, in any one of the three embodiments or modes of execution described in the foregoing, the method in accordance with the invention is completely different from the methods of manufacture of the prior art which simply provide for overmolding of a layer of plastic around a single leather slipper. In these methods of the prior art, it was in any case impossible to suggest such a method since the technical problems presented are entirely different.

In point of fact, the injection of plastic around an inner slipper of leather does not give rise to any particular difficulty since the surface of the injected layer is molded by the internal wall of the mold whereas the thickness of said layer is determined by the space left free around the leather slipper. In contrast, the design development of the method in accordance with the invention involves the basic concept of injection of plastic between two layers of leather and the need to overcome the preconceived opinion that the plastic would not be capable of spreading between these layers. Contrary to all expectations, it has in fact been proved that, in order to permit spreading of the plastic between the two layers of leather while maintaining them in spaced relation, it is only necessary to produce an injection pressure of sufficiently high value.

Taking these advantages into account, the method in accordance with the invention is particularly advantageous for the manufacture of sporting shoes having high uppers, however this method can also be employed for the manufacture of all types of shoes.

What is claimed is:

1. A shoe having an upper constituted by the combination of the uppers of two slippers of leather or like material of any suitable type fitted one inside the other and of a layer of plastic injected between the uppers of said two slippers and having a sole formed by the combination of the soles of said slippers and of a layer of plastic injected between said soles, wherein said shoe comprises an outsole constituted by a layer of plastic molded against the sole of the outer slipper, said plastic having flowed through holes formed in said sole of the outer slipper and thus being made integral with the plastic injected between the soles of the two slippers.

2. A shoe having an upper constituted by the combination of the uppers of two slippers of leather or like material of any suitable type fitted one inside the other and of a layer of plastic injected between the uppers of said two slippers and having a sole formed by the combination of the soles of said slippers and of a layer of plastic injected between said soles, wherein said shoe comprises a separate outsole fastened to the soles of the two slippers by means of connecting elements of plastic material which are molded within flow holes formed in the sole of the outer slipper.

3. A bhoe having an upper constituted by the combination of the uppers of two slippers of leather or like material of any suitable type fitted one inside the other and of a layer of plastic injected between the uppers of said two slippers and having a sole formed by the combination of the soles of said slippers and of a layer of plastic injected between said soles, wherein said shoe comprises an overmolded outsole of plastic material which has a higher degree of rigidity than the plastic between the two slippers and which constitutes at the rear end a heel containing a core of the same plastic material as the material between the two slippers.

4. A shoe according to claim 3, wherein the sole of the outer slipper is constituted by a part of molded plastic provided with an outwardly projecting flange on which is sewn the lower edge of the upper of said slipper and wherein the bottom edge of the upper of said slipper is provided at the rear end with an extension forming a skirt, said skirt being embedded within the molded block which constitutes the heel body.

5. A method of manufacture of a shoe in which an upper and a sole are provided with a layer of plastic overmolded on an inner slipper made of leather or like material of any suitable type, a metal packing former being placed within said inner slipper during the overmolding operation, wherein said method comprises the following steps:

fabrication of two high-upper slippers, each comprising an upper and a sole, of leather or like material of any suitable type, one of said slippers being of larger size than the other at all points and provided in the sole of said slipper with an orifice for the injection of plastic;

engagement of the slipper of smaller size within the slipper of larger size so as to have an inner and an outer slipper, wherein, spacer members are placed between the soles of the two slippers for the purpose of maintaining said soles in spaced relation to each other especially in proximity to the injection orifice provided in the sole of the outer shoe for admission of the injected plastic, positioning of a metal former within the inner slipper so as to have a completed assembly, placing the complete assembly within a mold comprising a bottom mold block corresponding to the sole and provided with a sprue for injection of plastic, the opening of said sprue being located opposite to the injection orifice of the sole of said outer slipper;

injection of plastic through the sprue, with the result that the injected plastic spreads within an internal space between the two soles and the two uppers of the two slippers and that the different parts of the finished shoe are constituted by the combination of two layers of leather or like material of any suitable type between which is enclosed a layer of plastic, and wherein provision is made in at least a portion of the sole of the outer slipper for at least one hole through which the plastic is permitted to flow beneath said sole during the injection operation in order to form at least part of an outsole of the shoe, a corresponding internal molding space or cavity being provided in the block which closes a respective end of the mold.

6. A method according to claim 5, wherein flow holes are formed over the entire surface of the sole of the outer slippper and provision is made on the surface of the mold block corresponding to the sole for a series of studs which are intended to reserve a space corresponding to the thickness of an outsole formed by injection of plastic.

7. A method according to claim 6, wherein a core is placed within the mold at the heel location, spacing studs being provided both above and beneath the heel core so as to ensure that said core is embedded in the molded plastic at said heel location.

8. A method according to claim 5, wherein the flow holes formed in the sole of the outer slipper are located opposite to the heel and a mold block is provided in the bottom portion of the mold for the operation which consists in injecting plastic between the two slippers, said mold block being applied against the sole of the outer slipper so as to reserve at the heel location a cavity which is capable of forming a central core for the heel of the shoe, whereupon a second injection operation is performed in order to overmold an outsole of plastic having a higher degree of rigidity which is intended at the rear end to surround the heel core and form a molded block.

9. A method according to claim 8, wherein a part of molded plastic is employed in order to form the sole of the outer slipper, the top face of said part being adapted to carry studs which are capable of maintaining the desired spacing with respect to the sole of the inner slipper and the peripheral portion of said part being provided with a downwardly projecting flange to which the bottom edge of the upper of the outer slipper is attached by stitching.

10. A method according to claim 9, wherein a downwardly projecting skirt is provided at the bottom portion of the upper of the outer slipper and, at the time of the second overmolding operation for the purpose of forming the outsole and the heel body, said skirt is embedded within the molded block which constitutes said heel body.

11. A method of manufacture of a shoe in which an upper and a sole are provided with a layer of plastic overmolded on an inner slipper made of leather or like material of any suitable type, a metal packing former being placed within said inner slipper during the overmolding operation, wherein said method comprises the following steps:

fabrication of two high-upper slippers, each comprising an upper and a sole, of leather or like material of any suitable type, one of said slippers being of larger size than the other at all points and provided in the sole of said slipper with an orifice for the injection of plastic;

engagement of the slipper of smaller size within the slipper of larger size so as to have an inner and an outer slipper, wherein spacer members are placed between the soles of the two slippers for the purpose of maintaining said soles in spaced relation to each other especially in proximity to the injection orifice provided in the sole of the outer shoe for admission of the injected plastic, positioning of a metal former within the inner slipper so as to have a completed assembly, placing the completed assembly within a mold comprising a bottom mold block corresponding to the sole and provided with a sprue for injection of plastic, the opening of said sprue being located opposite to the injection orifice of the sole of said outer slipper;

injection of plastic through the sprue, with the result that the injected plastic spreads within an internal space between the two soles and the two uppers of the two slippers and that the different parts of the finished shoe are constituted by the combination of two layers of leather or like material of any suitable type between which is enclosed a layer of plastic, and wherein, holes are provided over the entire surface of the sole of the outer slipper and prior to positioning of the two slippers, an outsole previously fabricated from plastic of the same type as the plastic to be injected in a subsequent operation is placed against the mold block which closes the corresponding end of the mold so that, at the time of said subsequent molding operation, the plastic which flows through the holes formed in the sole of the outer slipper coalesces and is thus made integral with the plastic of said outsole.

* * * * *